(12) United States Patent
Den Boer et al.

(10) Patent No.: US 8,624,826 B2
(45) Date of Patent: Jan. 7, 2014

(54) OUTDOOR READABLE LIQUID CRYSTAL DISPLAY DEVICE

(75) Inventors: Willem Den Boer, Shanghai (CN); Xuhui Peng, Shanghai (CN); Zhihua Ling, Shanghai (CN); Zhongshou Huang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 739 days.

(21) Appl. No.: 12/935,487

(22) PCT Filed: Mar. 31, 2009

(86) PCT No.: PCT/CN2009/711111
§ 371 (c)(1),
(2), (4) Date: Sep. 29, 2010

(87) PCT Pub. No.: WO2009/121295
PCT Pub. Date: Oct. 8, 2009

(65) Prior Publication Data
US 2011/0018856 A1    Jan. 27, 2011

(30) Foreign Application Priority Data

Apr. 3, 2008   (CN) .......................... 2008 1 0043215

(51) Int. Cl.
*G09G 3/36* (2006.01)
(52) U.S. Cl.
USPC ............... 345/102; 345/207; 349/68; 349/69; 362/97.3
(58) Field of Classification Search
USPC .................. 345/87–104, 207; 349/68–69; 362/97.1–97.4
See application file for complete search history.

(56) References Cited

U.S. PATENT DOCUMENTS

| | | | |
|---|---|---|---|
| 6,447,132 B1 | 9/2002 | Harter, Jr. | |
| 6,724,354 B1 * | 4/2004 | Spitzer et al. | 345/32 |
| 6,909,419 B2 * | 6/2005 | Zavracky et al. | 345/102 |
| 7,242,383 B2 * | 7/2007 | Zavracky et al. | 345/102 |
| 7,333,165 B2 | 2/2008 | Nakano et al. | |

(Continued)

FOREIGN PATENT DOCUMENTS

| | | |
|---|---|---|
| CN | 1428630 A | 7/2003 |
| CN | 1862647 A | 11/2006 |

(Continued)

*Primary Examiner* — Gene W Lee
(74) *Attorney, Agent, or Firm* — Harness, Dickey & Pierce, P.L.C.

(57) ABSTRACT

An outdoor readable liquid crystal display device (200) includes a liquid crystal panel (210), a backlight device (220) and a light source control device. The backlight device (220) includes a plurality of red light emitting diodes (220*r*), green light emitting diodes (220*g*) and blue light emitting diodes (220*b*). The light source control device is used to adjust the backlight device (220) based on the light intensity of ambient light. When the light intensity of ambient light is lower than a predetermined light intensity of the liquid crystal display device (200), the red light emitting diodes (220*r*), the green light emitting diodes (220*g*) and the blue light emitting diodes (220*b*) of the backlight device (220) are sequentially energized to emit lights at a predetermined time lag. When the light intensity of ambient light is higher than the predetermined light intensity, the red light emitting diodes (220*r*), the green light emitting diodes (220*g*) and the blue light emitting diodes (220*b*) of the backlight device (220) are energized to emit lights at the same time.

5 Claims, 6 Drawing Sheets

(56) References Cited

U.S. PATENT DOCUMENTS

| | | |
|---|---|---|
| 7,438,442 B2 | 10/2008 | Lee et al. |
| 7,532,176 B2 * | 5/2009 | Imade ............................ 345/32 |
| 7,893,915 B2 | 2/2011 | Woo et al. |
| 2003/0117355 A1 | 6/2003 | Yamauchi |
| 2003/0169226 A1 | 9/2003 | Yamada |
| 2006/0256257 A1 | 11/2006 | Nakano et al. |
| 2007/0081330 A1 | 4/2007 | Lee et al. |
| 2008/0001909 A1 | 1/2008 | Lim |

FOREIGN PATENT DOCUMENTS

| | | |
|---|---|---|
| CN | 1949504 A | 4/2007 |
| CN | 101055370 A | 10/2007 |
| CN | 101097695 A | 1/2008 |
| JP | 2007155829 A | 6/2007 |
| WO | WO-2007055131 A1 | 5/2007 |

* cited by examiner

Backlight sequence with weak ambient light

Backlight sequence with strong ambient light

Backlight sequence with weak ambient light

Backlight sequence with strong ambient light

OUTDOOR READABLE LIQUID CRYSTAL DISPLAY DEVICE

CROSS-REFERENCE TO RELATED APPLICATIONS

This application is a 371 U.S. National Stage of International Application No. PCT/CN2009/071111, filed Mar. 31, 2009. This application claims the benefit of Chinese Patent Application No. 200810043215.6, filed Apr. 3, 2008. The disclosures of the above applications are incorporated herein by reference.

FIELD OF THE INVENTION

The present invention relates to a liquid crystal display and in particular to an outdoor-readable liquid crystal display.

BACKGROUND OF THE INVENTION

In recent years, Liquid Crystal Displays (LCDs) have been widely used in electronics for representation of information due to their lightness, thinness, low power consumption, etc.

Conventional LCDs are broadly classified as either reflective or transmissive. Unlike Cathode Ray Tube (CRT) displays and Electroluminescent (EL) displays, LCDs are not self-emissive. A transmissive LCD is illuminated by a light source situated behind the LCD panel, and a reflective LCD is illuminated by ambient light. As a result, transmissive LCDs are less subjected to the intensity of ambient light and the contrast of the displayed image is higher, but transmissive LCDs are less power efficient due to the presence of the light source. Reflective LCDs are more power efficient because they do not need an additional light source, but the brightness and contrast of the displayed image in reflective LCDs are more subjected to the intensity of ambient light and the like. Particularly, their ability to resolve detail is notably limited in a dark environment.

A Field-Sequential Color Liquid Crystal Display (FSC-LCD) is a display with many advantageous features. The display switches on red, green and blue (R, G, B) backlights in sequence, which illuminate the display panel in sequence. That is, red, green and blue lights are applied in each pixel in sequence. Due to image sticking, the red, green and blue images are perceived by the observer as a continuous image.

Now refer to FIG. 1, a sectional view of the structure of a conventional FSC-LCD 1. The FSC-LCD 1 includes a first upper substrate 10, a first lower substrate 11, a first liquid crystal layer 12 provided between the first upper substrate 10 and the first lower substrate 11, and a first backlight device 13 for providing the light source of the FSC-LCD 1. The first backlight device 13 including a plurality of red Light-Emitting Diodes (LEDs) 13r, green LEDs 13g and blue LEDs 13b. First pixel electrodes 111 and Thin-Film Transistors (TFTs) 112 used as switches are formed on the side of the first lower substrate 11 immediately adjacent to the first liquid crystal layer 12. The TFTs 112 are electrically connected to the first pixel electrodes 111. A first common electrode 101 facing the first pixel electrodes 111 is formed on the side of the first upper substrate 10 immediately adjacent to the first liquid crystal layer 12. A black base 102 is provided between the first common electrode 101 and the first upper substrate 10, and in correspondence with the TFTs 112 of the first lower substrate 11, for blocking light from the regions excluding the first pixel electrodes 111 of the first lower substrate 11.

FIG. 2 is a top view of the first lower substrate 11 of the conventional FSC-LCD 1. The TFTs 112 used as pixel switches, data lines 113 for providing signals to the first pixel electrodes 111 of the first lower substrate 11, and gate lines 114 for providing switching signals to the TFTs 112 are provided on the first lower substrate 11. The data lines 113 and the gate lines 114 define multiple pixel regions 115. Each of the TFTs 112 is on the place in a pixel region 115, where a data line 113 and a gate line 114 meet, and is electrically connected to the data line 113 and the gate line 114.

FIG. 3 is a sequence diagram illustrating a method for driving the conventional FSC-LCD 1. The method for driving the FSC-LCD 1 includes: scanning each of the TFTs 112 according to the first backlight device 13, and realigning liquid crystal molecules in the first liquid crystal 12 to correspond to the lights emitted by the red LEDs 13r, green LEDs 13g and blue LEDs 13b of the first backlight device 13. Specifically, scanning of all of the TFTs (tTFT) 15, liquid crystal response (tLC) 16 and backlighting (tBL) 17 in the FSC-LCD 1 are performed in the period of a field 14.

FIG. 4 illustrates the principle of driving the conventional FSC-LCD 1. The FSC-LCD 1 further includes a first scanning driver 18 and a first data driver 19. With reference to FIG. 2, the first lower substrate 11 of the FSC-LCD 1 includes multiple pixel regions 115, and pixels in all the pixel regions 115 form an array. The first scanning driver 18 scans pixels in the pixel regions 115 row by row in sequence, and the first data driver 19 transmits the image data to a pixel column corresponding to the pixel regions 115.

However, for good outdoor readability of the conventional FSC-LCD 1 discussed-above, the brightness of light produced by the first backlight device 13 has to be elevated, resulting in increased power consumption.

In view of the problem in the prior art, the inventors conducted intensive studies with their vast experiences in the field, and invented the outdoor-readable LCD of the invention.

SUMMARY OF THE INVENTION

An object of the invention is to solve the drawback of the prior art, provide an outdoor-readable LCD, and realize high brightness for good outdoor readability.

To solve the problems above, the invention provides an outdoor-readable LCD, including: a liquid crystal panel including an upper substrate, a lower substrate and a liquid crystal layer provided between the upper substrate and the lower substrate; a backlight device including a plurality of red LEDs, green LEDs and blue LEDs; and a light source control device adapted to adjust the backlight device based on the intensity of ambient light. When the intensity of ambient light is lower than a predetermined light intensity of the outdoor-readable LCD, the red LEDs, the green LEDs and the blue LEDs of the backlight device are switched on in sequence to emit lights with predetermined delays; and when the intensity of ambient light is higher than the predetermined light intensity, the red LEDs, the green LEDs and the blue LEDs of the backlight device are switched on at the same time.

As discussed above, the outdoor-readable LCD applies red, green and blue (R, G, B) lights in sequence on the same pixel, for the eyes of the observer mixing the successive images into a color picture due to the image sticking, so that the invention without an expensive color filter, can realize outdoor readability, lower costs, improved resolution and lower power consumption, and increase illumination utilization of the backlight device.

Figure 1:
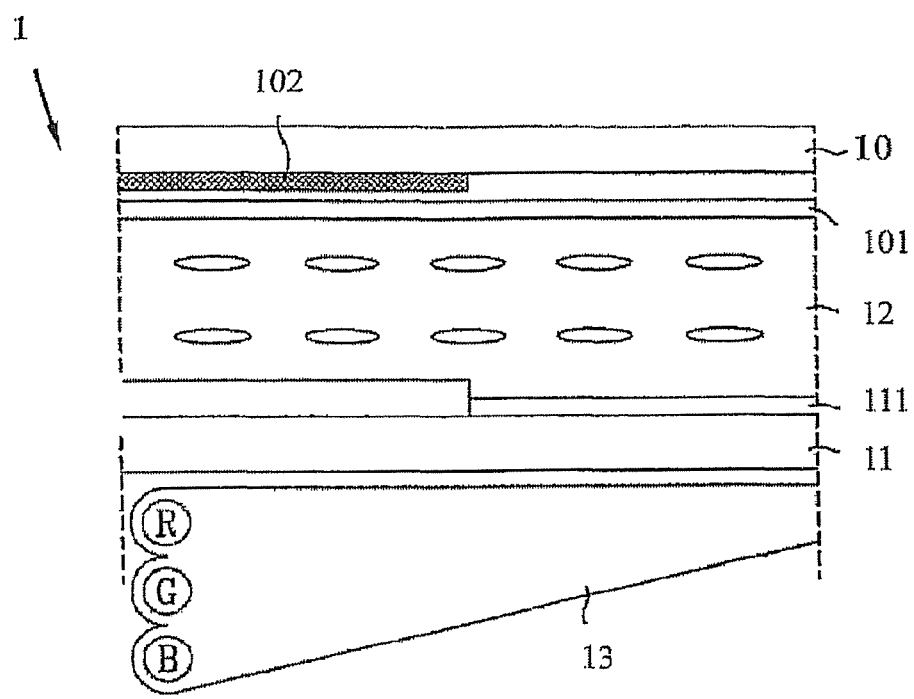
FIG. 1 is a sectional view of the structure of a conventional FSC-LCD.
Figure 2:
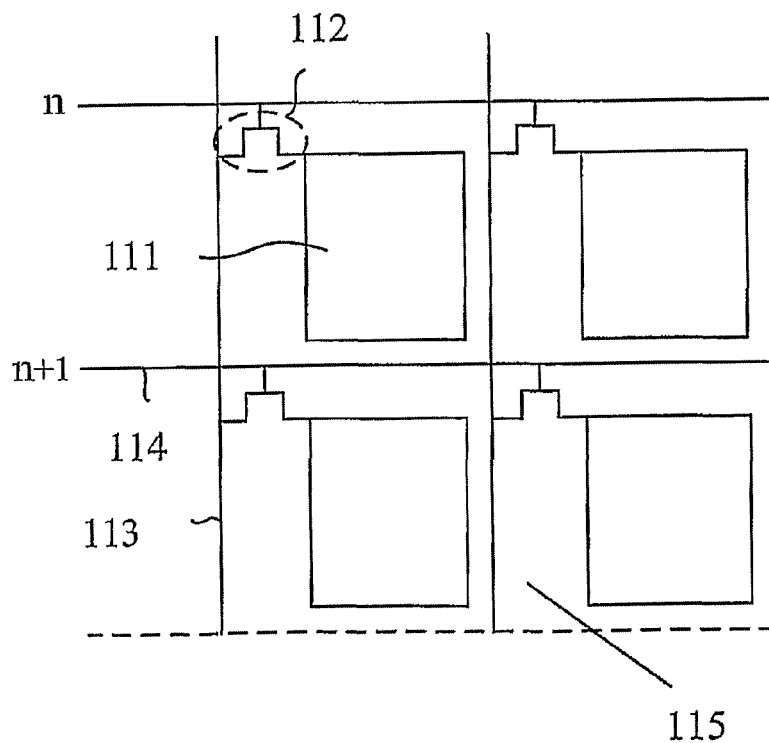
FIG. 2 is a top view of the first lower substrate of the conventional FSC-LCD.
Figure 3:
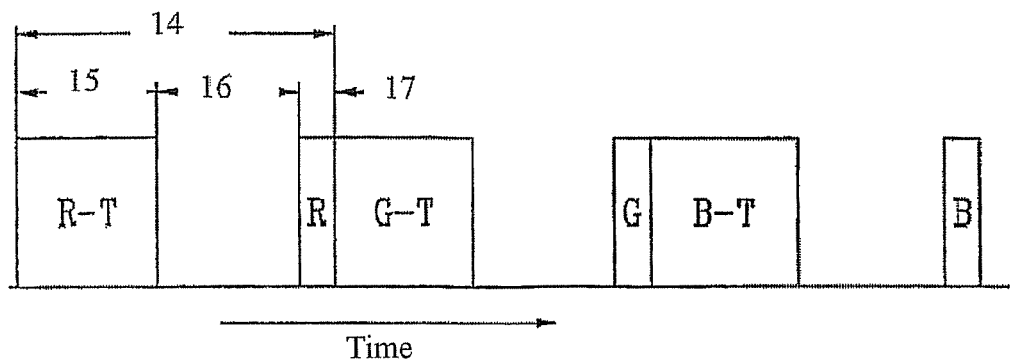
FIG. 3 is a sequence diagram of the conventional FSC-LCD.
Figure 4:
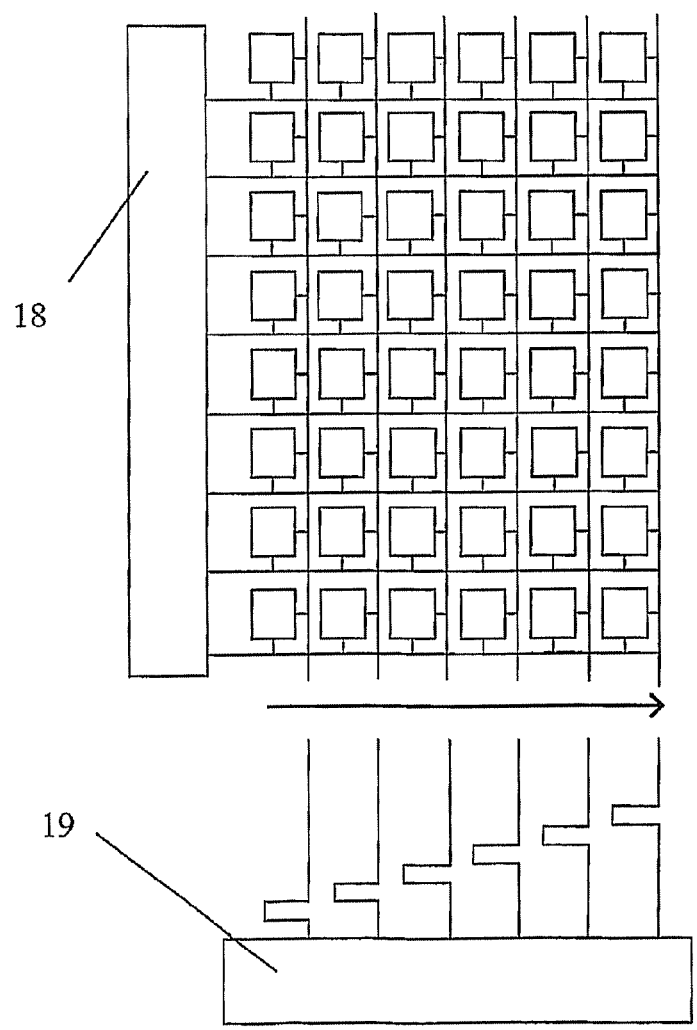
FIG. 4 illustrates the principle of driving the conventional FSC-LCD.

Numerals for the elements in the drawings are listed below:

| [Prior art] | | | |
|---|---|---|---|
| FSC-LCD | 1 | | |
| First upper substrate | 10 | First common electrode | 101 |
| First lower substrate | 11 | First pixel electrode | 111 |
| TFT | 112 | Data line | 113 |
| Gate line | 114 | Pixel region | 115 |
| First liquid crystal layer | 12 | First backlight device | 13 |
| Period | 14 | Scanning of TFTs | 15 |
| Liquid crystal response | 16 | Backlighting | 17 |
| First scanning driver | 18 | First data driver | 19 |
| [The invention] | | | |
| Outdoor-readable LCD | 200 | | |
| Liquid crystal panel | 210 | Second pixel electrode | 211 |
| Second low substrate | 212 | Second upper substrate | 213 |
| Second common electrode | 214 | Second liquid crystal layer | 215 |
| Second backlight device | 220 | First polarizing plate | 221a |
| Red LED | 222r | Green LED | 222g |
| Blue LED | 222b | White LED | 222w |
| Second scanning driver | 230 | Second data driver | 240 |

DETAILED DESCRIPTION OF THE INVENTION

The technical solution, structural features, objects and effects of the invention are described hereinafter in connection with the embodiments and the figures.

First Embodiment

Figure 5:
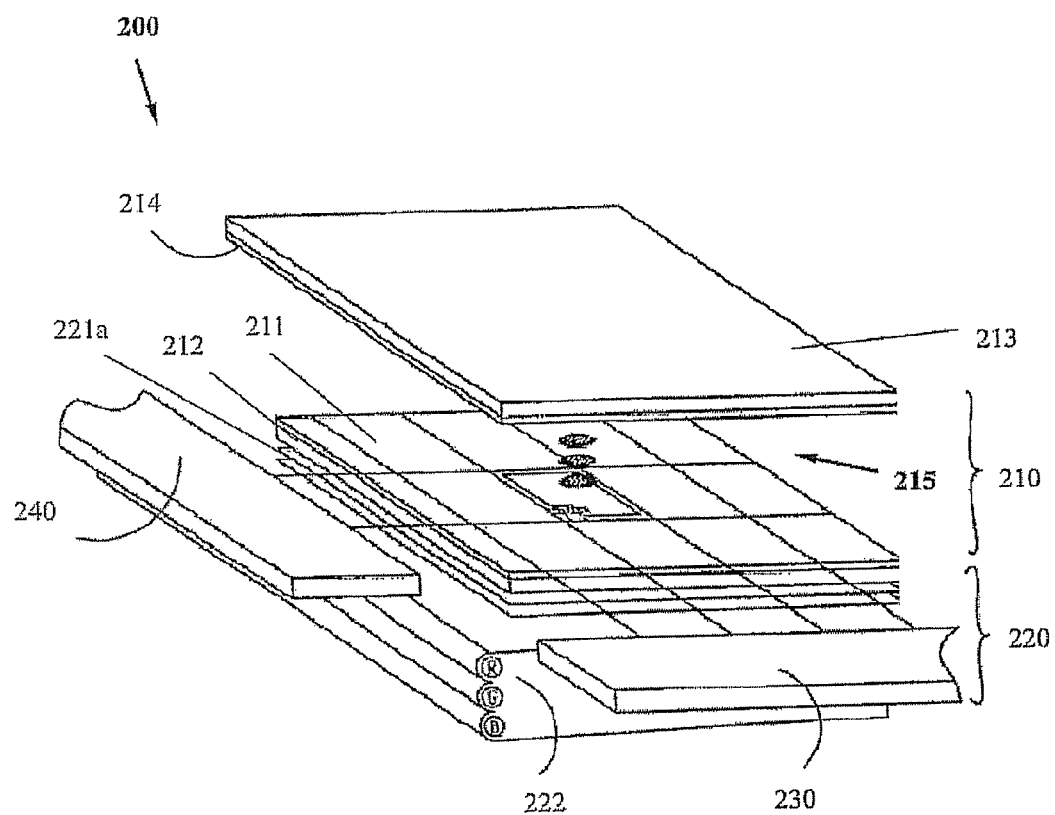
FIG. 5 is an exploded view of an outdoor-readable LCD according to the invention.

As shown in FIG. 5, an outdoor-readable LCD 200 of the invention includes: a liquid crystal panel 210, a second backlight device 220 adapted to illuminate the liquid crystal panel 210, a second scanning driver 230 adapted to provide a scanning signal to the liquid crystal panel 210, a second data driver 240 adapted to provide a data signal to the liquid crystal panel 210, and a light source control device (not shown) adapted to adjust the brightness of the second backlight device 220. The liquid crystal panel 210 includes: a second lower substrate 212 including second pixel electrodes 211, a second upper substrate 213 facing to the second lower substrate 212, a second common electrode 214 provided on the side of the second upper substrate 213 facing to the second lower substrate 212, and a second liquid crystal layer 215 provided between the second lower substrate 212 and the second upper substrate 213. The second backlight device 220 includes a plurality of red LEDs 220r, green LEDs 220g and blue LEDs 220b, and further includes a first polarizing plate 221a and a second polarizing plate (not shown). The first polarizing plate 221a is mounted on the side of the second lower substrate 212 opposite to the second pixel electrodes 211. The second polarizing plate is mounted on the side of the second upper substrate 213 opposite to the second common electrode 214. The red LEDs 220r, green LEDs 220g and blue LEDs 220b of the second backlight device 220 are provided facing to the first polarizing plate 221a with a certain distance between the second backlight device 220 and the first polarizing plate 221a. When the red LEDs 220r, green LEDs 220g and blue LEDs 220b of the second backlight device 220 are switched on in sequence, the red LEDs 220r, the green LEDs 220g and the blue LEDs 220b emit red, green and blue lights with predetermined delays; or, the red LEDs 220r, green LEDs 220g and blue LEDs 220b are switched on at the same time, and the red, green and blue lights emitted are superimposed, resulting in white light.

Particularly, the outdoor-readable LCD according to the invention may further include an ambient light sensor (not shown), adapted to sense the intensity of ambient light and output a sensing signal. The light source control device adjusts the second backlight device 220 based on the sensing signal.

Figure 6:
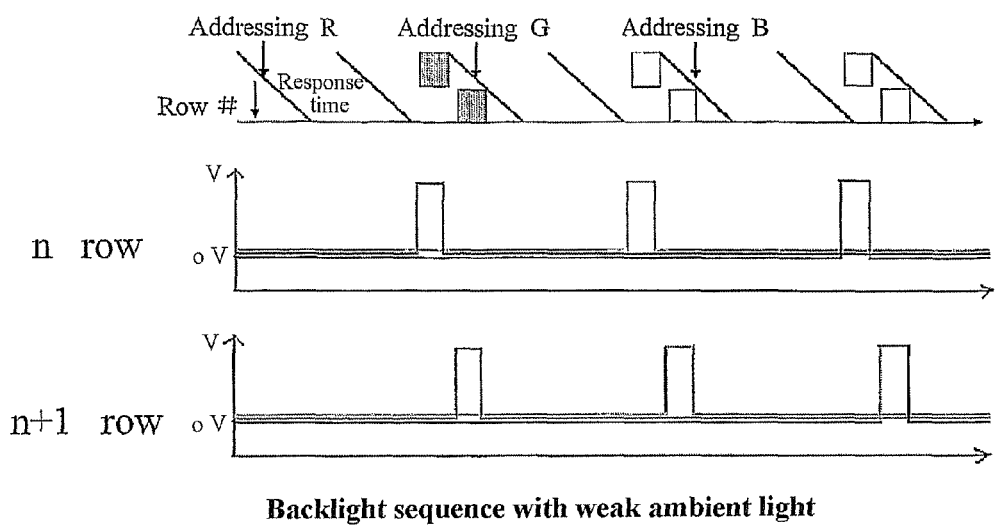
FIG. 6(a) and FIG. 6(b) are sequence diagrams for backlight in an outdoor-readable LCD according to a first embodiment of the invention.
Figure 6:
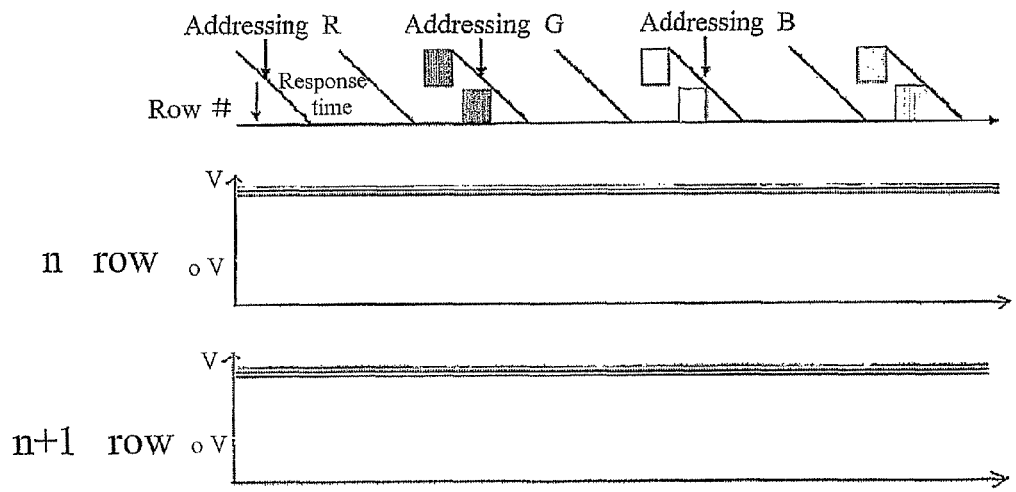

Now refer to FIG. 6(a) and FIG. 6(b). When the intensity of ambient light detected by the ambient light sensor is lower than a predetermined light intensity of the outdoor-readable LCD 200, the light source control device switches on the red LEDs 220r, the green LEDs 220g and the blue LEDs 220b in sequence according to the sensing signal, and the red LEDs 220r, the green LEDs 220g and the blue LEDs 220b emit red, green and blue lights with predetermined delays. The red, green and blue lights enter the first polarizing plate 221a, and pass through the second lower substrate 212, to the second liquid crystal layer 215. Lights arrived at the second liquid crystal layer 215 pass through the second upper substrate 213, and leave from the second polarizing plate, to form a color image. When the intensity of ambient light detected by the ambient light sensor is higher than the predetermined light intensity of the outdoor-readable LCD 200, the light source control device switches on the red LEDs 220r, the green LEDs 220g and the blue LEDs 220b of the second backlight device 220 at the same time according to the sensing signal, and the red LEDs 220r, the green LEDs 220g and the blue LEDs 220b of the second backlight device 220 emit red, green and blue lights correspondingly. The red, green and blue lights are superimposed into white light. The white light enters the first polarizing plate 221a, and passes through the second lower substrate 212, to the second liquid crystal layer 215. Light arrived at the second liquid crystal layer 215 passes through the second upper substrate 213, and leaves from the second polarizing plate, to form a monochrome image with high brightness.

Second Embodiment

This embodiment differs from the first embodiment in the backlight device. Specifically, the second backlight device 220 of the outdoor-readable LCD 200 based on the first embodiment is provided with additional white LEDs 220w (not shown). For other arrangements regarding the outdoor-readable LCD 200, one may refer to the first embodiment.

Figure 7:
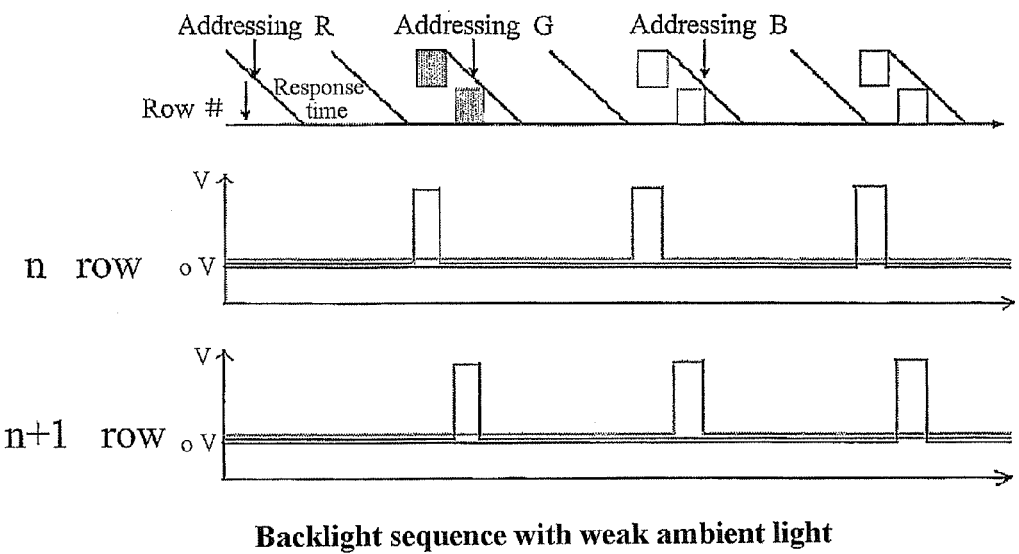
FIG. 7(a) and FIG. 7(b) are sequence diagrams for backlight in an outdoor-readable LCD according to a second embodiment of the invention.
Figure 7:
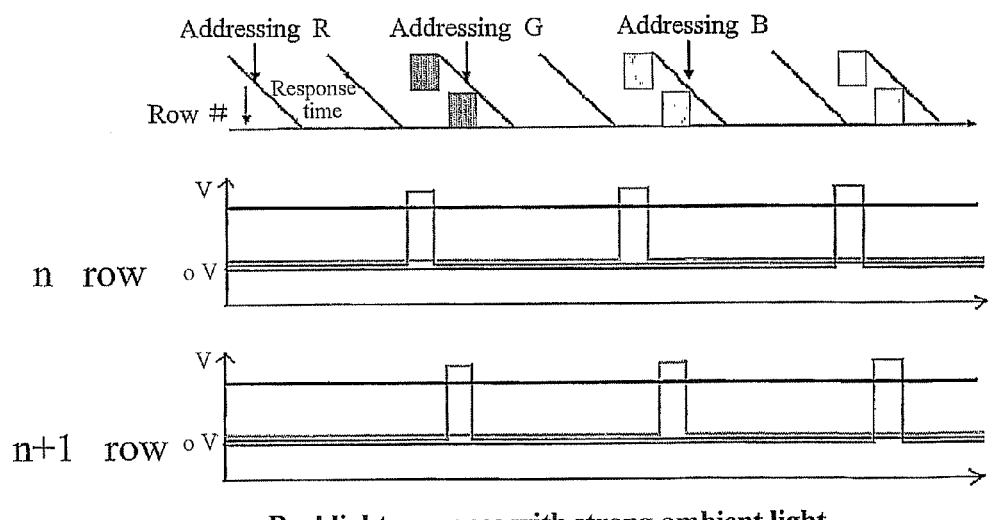

Now refer to FIG. 7(a) and FIG. 7(b). When the intensity of ambient light detected by the ambient light sensor is lower than a predetermined light intensity of the outdoor-readable LCD 200, the light source control device switches off the white LEDs 220w, and switches on the red LEDs 220r, the green LEDs 220g and the blue LEDs 220b of the second backlight device 220 in sequence according to the sensing signal. The red LEDs 220r, the green LEDs 220g and the blue LEDs 220b emit red, green and blue lights with predetermined delays. The red, green and blue lights enter the first polarizing plate 221 a, and pass through the second lower substrate 212, to the second liquid crystal layer 215. Lights arrived at the second liquid crystal layer 215 pass through the second upper substrate 213, and leave from the second polarizing plate, to achieve color representation. When the detected intensity of ambient light is higher than the predetermined light intensity of the outdoor-readable LCD 200, the white LEDs 220w are switched on, meanwhile, the red LEDs 220r, the green LEDs 220g and the blue LEDs 220b are switched on in sequence to emit red, green and blue lights. The red, green and blue lights enter the first polarizing plate 221a, and pass through the second lower substrate 212, to the second liquid crystal layer 215. Lights arrived at the second liquid crystal layer 215 pass through the second upper substrate 213, and leave from the second polarizing plate. By switching on the white LEDs 220w, additional white back light is provided to the outdoor-readable LCD 200, thereby enhancing its backlight and forming a color image with high brightness.

Third Embodiment

As shown in FIG. 5, an outdoor-readable LCD 200 of the invention includes: a liquid crystal panel 210, a second backlight device 220 adapted to illuminate the liquid crystal panel 210, a second scanning driver 230 adapted to provide a scanning signal to the liquid crystal panel 210, a second data driver 240 adapted to provide a data signal to the liquid crystal panel 210, and a light source control device (not shown) adapted to adjust the brightness of the second backlight device 220. The liquid crystal panel 210 includes: a second lower substrate 212 including second pixel electrodes 211, a second upper substrate 213 facing the second lower substrate 212, a second common electrode 214 provided on the side of the second upper substrate 213 facing to the second lower substrate 212, and a second liquid crystal layer 215 provided between the second lower substrate 212 and the second upper substrate 213. The second backlight device 220 includes a number of red LEDs 220r, green LEDs 220g and blue LEDs 220b, and further includes a first polarizing plate 221a and a second polarizing plate. The first polarizing plate 221a is mounted on the side of the second lower substrate 212 facing away from the second pixel electrodes 211. The second polarizing plate is mounted on a side of the second upper substrate 213 facing away from the second common electrode 214. The red LEDs 220r, green LEDs 220g and blue LEDs 220b of the second backlight device 220 are provided facing the first polarizing plate 221a from a certain distance away. When the red LEDs 220r, green LEDs 220g and blue LEDs 220b of the second backlight device 220 are switched on in sequence, the red LEDs 220r, the green LEDs 220g and the blue LEDs 220b emit red, green and blue lights with predetermined delays; or, the red LEDs 220r, green LEDs 220g and blue LEDs 220b are switched on at the same time, and the red, green and blue lights emitted are superimposed, resulting in white light.

Particularly, the outdoor-readable LCD according to the invention may further include an ambient light sensor (not shown), adapted to sense the intensity of ambient light and output a sensing signal. The light source control device adjusts the second backlight device 220 based on the sensing signal.

Figure 8:
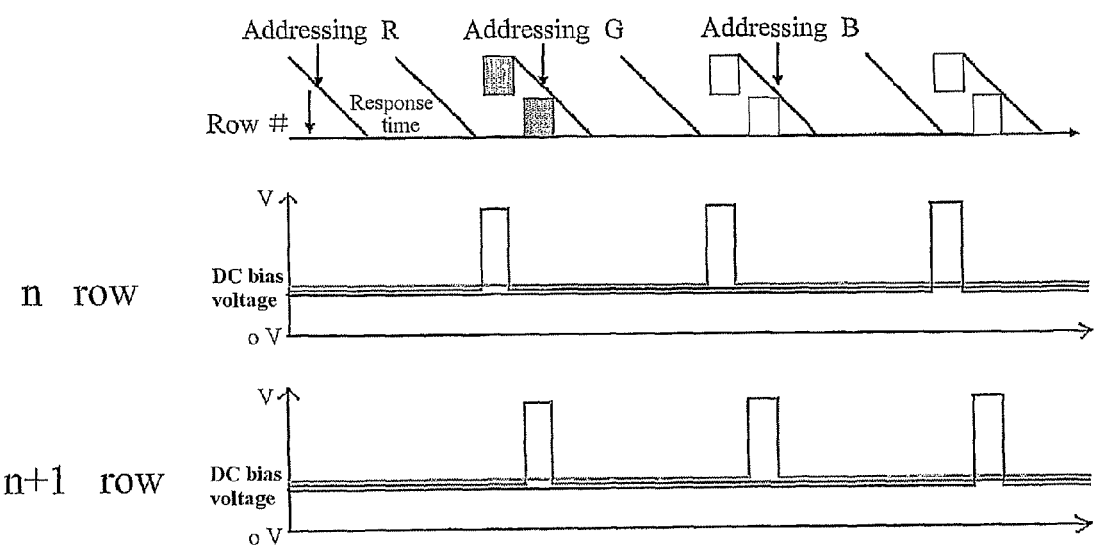
FIG. 8 is a sequence diagram for backlight in an outdoor-readable FSC-LCD according to a third embodiment of the invention.

Now refer to FIG. 8. When the intensity of ambient light detected by the ambient light sensor is lower than a predetermined light intensity of the outdoor-readable LCD 200, the light source control device adjusts a bias voltage V of the red LEDs 220r, the green LEDs 220g and the blue LEDs 220b of the second backlight device 220 to be zero according to the sensing signal, and the red LEDs 220r, the green LEDs 220g and the blue LEDs 220b are switched on in sequence to emit red, green and blue lights with predetermined delays. The red, green and blue lights enter the first polarizing plate 221a, and pass through the second lower substrate 212, to the second liquid crystal layer 215. Lights arrived at the second liquid crystal layer 215 pass through the second upper substrate 213, and leave from the second polarizing plate. When the intensity of ambient light detected by the ambient light sensor is higher than the predetermined light intensity of the outdoor-readable LCD 200, the light source control device adjusts the bias voltage V of the red LEDs 220r, the green LEDs 220g and the blue LEDs 220b of the second backlight device 220 according to the sensing signal, by setting the bias voltage V to a predetermined value according to the intensity of ambient light. Thereby the brightness of backlight provided by the second backlight device 220 are elevated, and the red LEDs 220r, the green LEDs 220g and the blue LEDs 220b are switched on in sequence to emit red, green and blue lights with predetermined delays. The red, green and blue lights enter the first polarizing plate 221a, and pass through the second lower substrate 212, to the second liquid crystal layer 215. Lights arrived at the second liquid crystal layer 215 pass through the second upper substrate 213, and leave from the second polarizing plate, to form a color image with high brightness.

To sum up, the outdoor-readable LCD 200 applies red, green and blue (R, G, B) lights in sequence on the same pixel. The eyes of the observer mix the successive images into a color picture due to image sticking. The invention without an expensive color filter, can realize outdoor readability, lower costs, lower power consumption and improved resolution, and increase illumination utilization of the backlight device.

Those skilled in the art shall understand that various modifications and alternations of the invention can be made without deviation from the scope of the invention. Accordingly, the invention shall include those modifications and alternations within the scope defined by the appended claims.

The invention claimed is:

1. An outdoor-readable Liquid Crystal Display (LCD), comprising:
   a liquid crystal panel, the liquid crystal panel comprising an upper substrate, a lower substrate and a liquid crystal layer provided between the upper substrate and the lower substrate;
   a backlight device, comprising a plurality of red Light-Emitting Diodes (LEDs), green LEDs and blue LEDs; and
   a light source control device, adapted to adjust the backlight device based on the intensity of ambient light, wherein, when the intensity of ambient light is lower than a predetermined light intensity of the outdoor-readable LCD, a bias voltage of the red LEDs, the green LEDs and the blue LEDs of the backlight device is set to zero, and the red LEDs, the green LEDs and the blue LEDs are switched on in sequence to emit lights with predetermined delays; and when the intensity of ambient light is higher than the predetermined light intensity, the bias voltage of the red LEDs, the green LEDs and the blue LEDs of the backlight device is elevated, and the red LEDs, the green LEDs and the blue LEDs are switched on in sequence to emit lights with predetermined delays.

2. The outdoor-readable LCD according to claim 1, wherein the outdoor-readable LCD further comprises an ambient light sensor adapted to detect the intensity of ambient light and output a sensing signal; and wherein the light source control device is adapted to adjust the backlight device based on the sensing signal.

3. The outdoor-readable LCD according to claim 1, wherein when the intensity of ambient light is higher than the predetermined light intensity, the increment of the bias voltage of the red LEDs, the green LEDs and the blue LEDs of the backlight device increases as the intensity of ambient light increases.

4. The outdoor-readable LCD according to claim 3, wherein the outdoor-readable LCD further comprises an ambient light sensor adapted to detect the intensity of ambient light and output a sensing signal; and wherein the light source control device is adapted to adjust the backlight device based on the sensing signal.

5. A method for driving an outdoor-readable Liquid Crystal Display (LCD), wherein the outdoor-readable LCD comprises:
- a liquid crystal panel, the liquid crystal panel comprising an upper substrate, a lower substrate and a liquid crystal layer provided between the upper substrate and the lower substrate;
- a backlight device, comprising a plurality of red Light-Emitting Diodes (LEDs), green LEDs and blue LEDs; and
- a light source control device, adapted to adjust the backlight device based on the intensity of ambient light, and wherein the method for driving the outdoor-readable LCD comprises: when the intensity of ambient light is lower than a predetermined light intensity of the outdoor-readable LCD, setting a bias voltage of the red LEDs, the green LEDs and the blue LEDs of the backlight device to zero, and switching on the red LEDs, the green LEDs and the blue LEDs in sequence to emit lights with predetermined delays; and when the intensity of ambient light is higher than the predetermined light intensity, elevating the bias voltage of the red LEDs, the green LEDs and the blue LEDs of the backlight device, and switching on the red LEDs, the green LEDs and the blue LEDs in sequence to emit lights with predetermined delays.

* * * * *

UNITED STATES PATENT AND TRADEMARK OFFICE
CERTIFICATE OF CORRECTION

PATENT NO.        : 8,624,826 B2                                               Page 1 of 1
APPLICATION NO.   : 12/935487
DATED             : January 7, 2014
INVENTOR(S)       : Willem Den Boer et al.

It is certified that error appears in the above-identified patent and that said Letters Patent is hereby corrected as shown below:

Title Page, Item (86), Column 1, Line 1 (PCT. No.); Delete "PCT/CN2009/711111" and insert --PCT/CN2009/71111--

Signed and Sealed this
Twenty-sixth Day of August, 2014

Michelle K. Lee
*Deputy Director of the United States Patent and Trademark Office*